Figure 1:
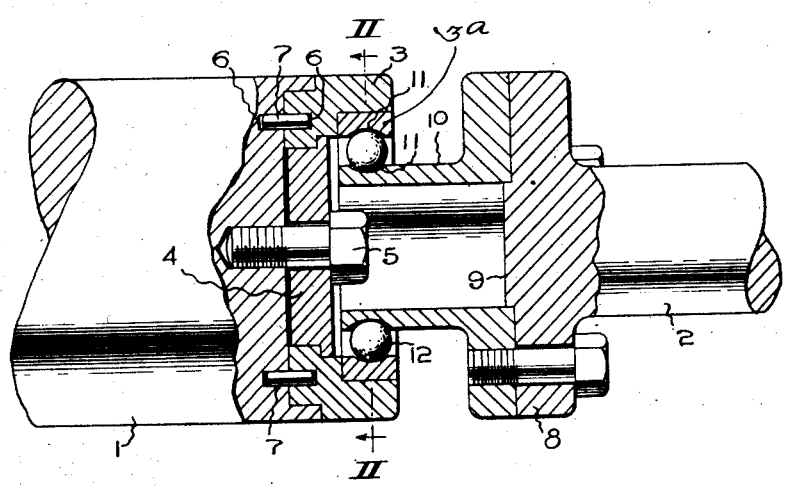

Aug. 28, 1928.

W. E. TRUMPLER 1,682,444

FLEXIBLE COUPLING

Filed May 28, 1924

WITNESSES:

INVENTOR
William E. Trumpler
BY
ATTORNEY

Patented Aug. 28, 1928.

1,682,444

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE COUPLING.

Application filed May 28, 1924. Serial No. 716,332.

My invention relates to flexible couplings, more particularly to couplings for joining a pair of shaft members in co-axial alinement.

It is among the objects of my invention to provide a flexible coupling which shall be of simple, compact and durable mechanical construction, which shall be adapted to provide tangential and axial flexibility for the coupled parts and also a certain amount of angular flexibility relative to the transmission of power.

My type of coupling is particularly adapted for use in turbo-exciter drives, as it is capable of absorbing shocks and impacts, thereby eliminating vibration that is detrimental to the bearing and the winding parts.

In a copending application, Serial No. 716,327, filed May 28, 1924, there is described a flexible coupling comprising a plurality of complementary ring members that are associated with inner flexible rings by a plurality of symmetrically spaced ball members, which construction provides a relatively large amount of flexibility for the size and strength of the coupling member.

My present invention is directed to a coupling utilizing but one set of balls lying in a single transverse plane and which co-ordinate with an outer and an inner ring or sleeve member to provide substantially the same characteristics as the coupling member referred to.

I propose to utilize a ring member that may be coupled to one of a pair of co-axially alined shaft members, and a yieldable sleeve member that is secured to the cooperating shaft member, the sleeve member being relatively long and disposed within the ring of the cooperating shaft. A plurality of ball members are fitted in apertures or seating portions of the outer and the inner ring or sleeve member, respectively. These rings constitute the connecting medium between the shaft elements.

Figure 2:
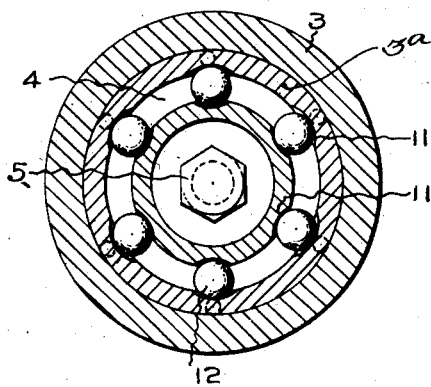

In the accompanying drawing constituting a part hereof and in which like reference characters designate like parts:

Figure 1 is a view in longitudinal section of a coupling member embodying the principles of my invention, and Fig. 2 is a view thereof in cross-section taken along the lines II—II of Fig. 1.

The coupling comprises a pair of co-axially alined shafts 1 and 2, shaft 1 being counterbored and having a ring member 3 secured thereto by an off-set disk or clamping plate 4, which is fastened by a screw bolt 5 to the center shaft 1. A plurality of small coaxially alined recesses 6 are respectively provided in the ring 3 and the shaft 1 for carrying pins 7, through which torque is transmitted from the shaft to the ring member. A hardened steel ring $3^a$ is secured by a press fit to the ring 3 as shown.

The shaft member 2 is provided with an expanded or flanged end 8 having an offset portion 9 and which is adapted to engage the inner wall of a flanged sleeve member 10. The sleeve 10 has a relatively long extension or hub which is flexible or yieldable and which is centrally disposed within the ring member 3. The ring $3^a$ and yieldable sleeve 10 are severally provided with annular recesses or seating portions 11, which are ellipsoidal in shape and pairs of which are disposed in radial alinement to receive a plurality of ball members 12. The recesses or ball seats are symmetrically spaced, as shown in Fig. 2, and the shape of the seats 11 is such as to allow relative movement of the sleeve 10 and ring $3^a$ both axially and angularly.

When torque is being transmitted by the coupling, the ball members 12 are subjected to a shearing or rolling action that tends to wedge them between the sides of the recess 11 and, consequently, the yieldable sleeve member 10 is deflected.

By varying the radii of the ellipsoidal seats, any ratio of radial and tangential deflection may be obtained. The yieldable sleeve and number of balls may also be so proportioned that the deflection of the sleeve will be such that one or more points between the ball seats will sustain no radial deflection, whereby the pins 7 will transmit tangential load only, without being subjected to radial shearing stresses.

The spring characteristic of this type of coupling for any deflection is a rising one and there will be a relatively large deflection for an increase in torque under low torque conditions and less deflection for a similar increase in torque under high torque conditions. The coupling may safely be subjected to a substantial overload, as the stresses in the materials do not increase as fast as the torsional load.

The ball members 11 may be inserted between the member 3ª and sleeve 10 in any suitable manner, as by shrinking the ring 3ª on the ball members, or in the manner employed in assembling ball bearings of somewhat similar construction.

It is evident from the foregoing description of my invention that flexible couplings made in accordance therewith provide a simple and efficient means for connecting rotatable machine units and that such couplings are relatively inexpensive and adapted to be economically manufactured in large quantities.

Although I have described a specific embodiment of my invention, it will be obvious to those skilled in the art that various modifications may be made in the details of construction and the size and proportion of the several co-operating parts without departing from the principles herein set forth.

I claim as my invention:—

1. A flexible coupling comprising a pair of shaft members in coaxial alinement, a ring member sceured to one of said shafts, a yieldable sleeve secured to the other of said shafts, and a plurality of balls interposed between said ring and sleeve to co-operatively engage the same.

2. A flexible coupling comprising a pair of shaft members in coaxial alinement, a ring member secured to one of said shafts, a yieldable sleeve secured to the other of said shafts and extending into said ring member, and a plurality of balls interposed between said ring and sleeve to co-operatively engage the same.

3. A flexible coupling comprising a pair of shaft members in coaxial alinement, a ring member secured to the end of one of said shafts, a yieldable sleeve secured to the end of the other of said shafts, and a plurality of balls interposed between said ring and sleeve to co-operatively engage the same.

4. A flexible coupling comprising a pair of shaft members in coaxial alinement, a ring member secured to the end of one of said shafts, a yieldable sleeve secured to the other of said shafts and extending into said ring, said ring having a plurality of symmetrically spaced apertures in the inner face thereof and said sleeve having corresponding apertures in the outer periphery thereof, pairs of said apertures being in radial alinement, and balls disposed in said apertures.

5. A flexible coupling comprising a pair of shaft members in coaxial alinement, a ring member secured to the end of one of said shafts, a yieldable sleeve secured to the other of said shafts and extending into said ring, said ring having a plurality of symmetrically spaced apertures in the inner face thereof and said sleeve having corresponding apertures in the outer periphery thereof, said apertures lying in a single transverse plane, and balls disposed in said apertures.

6. A flexible coupling comprising a pair of shaft members in coaxial alinement, a ring member secured to the end of one said shafts, a yieldable sleeve secured to the other of said shafts and extending into said ring, said ring having a plurality of symmetrically spaced ellipsoidal seats in the inner face thereof and said sleeve having corresponding ellipsoidal seats in the outer periphery thereof, said apertures lying in a single transverse plane, and balls disposed in said ellipsoidal seats.

7. A flexible coupling comprising a pair of shafts in coaxial alinement, one having a counter-bore in the end face thereof and the other having an offset projection on the end face thereof, a ring member secured in the counter-bore of said one shaft and a yieldable sleeve secured on the projection of the other of said shafts, said ring and sleeve having seating portions in co-operative alinement in a single transverse plane, and balls disposed in said seating portions to co-operatively engage the said ring and sleeve.

In testimony whereof, I have hereunto subscribed my name this 21st day of May 1924.

WILLIAM E. TRUMPLER.